United States Patent [19]
Selgas et al.

[11] Patent Number: 5,724,549
[45] Date of Patent: Mar. 3, 1998

[54] CACHE COHERENCY WITHOUT BUS MASTER ARBITRATION SIGNALS

[75] Inventors: Thomas D. Selgas, Garland, Tex.; Thomas B. Brightman, Niwot, Colo.; William C. Patton, Jr., Plano, Tex.

[73] Assignee: Cyrix Corporation, Richardson, Tex.

[21] Appl. No.: 131,043

[22] Filed: Oct. 1, 1993

Related U.S. Application Data

[63] Continuation of Ser. No. 935,564, Aug. 26, 1992, abandoned, which is a continuation-in-part of Ser. No. 864,399, Apr. 6, 1992, abandoned.

[51] Int. Cl.$^6$ .................................................. G06F 13/00
[52] U.S. Cl. .................................. 395/468; 395/462
[58] Field of Search .......................... 395/469, 478, 395/485, 468, 462

[56] References Cited

U.S. PATENT DOCUMENTS

| | | | |
|---|---|---|---|
| 3,845,474 | 10/1974 | Lange et al. | 340/172.5 |
| 4,695,943 | 9/1987 | Keeley et al. | 395/467 |
| 4,755,930 | 7/1988 | Wilson | 395/449 |

(List continued on next page.)

FOREIGN PATENT DOCUMENTS

| | | |
|---|---|---|
| 0153109 A2 | 8/1985 | European Pat. Off. . |
| 0220451 A2 | 5/1987 | European Pat. Off. . |
| 0363840 A2 | 4/1990 | European Pat. Off. . |
| 0380861 A2 | 8/1990 | European Pat. Off. . |
| 0396940 A2 | 11/1990 | European Pat. Off. . |
| 0404369 A2 | 12/1990 | European Pat. Off. . |
| 0409556 A2 | 1/1991 | European Pat. Off. . |
| 0447160 A2 | 9/1991 | European Pat. Off. . |
| 0470561 A2 | 2/1992 | European Pat. Off. . |
| 0470574 A2 | 2/1992 | European Pat. Off. . |
| 0482752 A2 | 4/1992 | European Pat. Off. . |
| 0489556 A2 | 6/1992 | European Pat. Off. . |
| 0510821 A1 | 10/1992 | European Pat. Off. . |
| 0533373 A2 | 3/1993 | European Pat. Off. . |
| 3046912A1 | 9/1981 | Germany . |
| 3012205C2 | 10/1981 | Germany . |

(List continued on next page.)

OTHER PUBLICATIONS

Design&Electronik, Rainer Huttenloher, Das Imperium Schlagt Zuruck, Teil 2, Feb. 20, 1990, Ausgabe 4, pp. 76, 78–80, 82, 87–88.

(List continued on next page.)

*Primary Examiner*—David L. Robertson
*Attorney, Agent, or Firm*—Andrew S. Viger; John L. Maxin

[57] ABSTRACT

A method of data communication between asynchronous processes of a computer system is disclosed in connection with a cache coherency system for a processor-cache used in a multi-master computer system in which bus arbitration signals either are not available to the processor-cache, or are not exclusively relied on by the processor-cache to assure validity of the data in the cache (e.g., a 386-bus compatible computer system using an external secondary cache in which bus arbitration signals are only connected to and used by the secondary cache controller). In an exemplary external-chip implementation, the cache coherency system (120) comprises two PLAs—a FLUSH module (122) and a WAVESHAPING module (124). The FLUSH module (a) receives selected bus cycle definition and control signals from a microprocessor ((110), (b) detects FLUSH (cache invalidation) conditions, i.e., bus master synchronization events, and for each such FLUSH condition, (c) provides a FLUSH output signal. The WAVESHAPING module provides a corresponding CPU/FLUSH signal to the microprocessor with the appropriate set up and hold time. The exemplary bus master synchronization events, or FLUSH conditions, that cause cache invalidation are: (a) hardware generated interrupts, and (b) read or read/write accesses to I/O address space, except for those directed to a hard disk or an external coprocessor. If the bus architecture uses memory-mapped I/O, accesses to selected regions of memory-mapped I/O space could also be used. The cache coherency functionality could be implemented on-board the microprocessor.

40 Claims, 3 Drawing Sheets

U.S. PATENT DOCUMENTS

| | | | |
|---|---|---|---|
| 4,821,170 | 4/1989 | Bernick et al. | 364/200 |
| 4,912,631 | 3/1990 | Lloyd | 395/445 |
| 4,928,225 | 5/1990 | McCarthy et al. | 395/472 |
| 4,933,835 | 6/1990 | Sachs et al. | 395/450 |
| 5,012,410 | 4/1991 | Ueda | 395/403 |
| 5,029,070 | 7/1991 | McCarthy et al. | 395/470 |
| 5,045,996 | 9/1991 | Barth et al. | 395/470 |
| 5,072,369 | 12/1991 | Theus et al. | 395/473 |
| 5,073,969 | 12/1991 | Shoemaker | 395/307 |
| 5,091,845 | 2/1992 | Rubinfeld | 395/181 |
| 5,091,846 | 2/1992 | Sachs et al. | 395/250 |
| 5,091,850 | 2/1992 | Culley | 395/403 |
| 5,095,428 | 3/1992 | Walker et al. | 395/462 |
| 5,097,532 | 3/1992 | Borup et al. | 395/471 |
| 5,113,510 | 5/1992 | Hillis | 395/448 |
| 5,146,603 | 9/1992 | Frost et al. | 395/470 |
| 5,157,774 | 10/1992 | Culley | 395/466 |
| 5,175,833 | 12/1992 | Yarkoni et al. | 395/446 |
| 5,179,675 | 1/1993 | Cole et al. | 395/403 |
| 5,193,170 | 3/1993 | Lam | 395/473 |
| 5,210,845 | 5/1993 | Crawford et al. | 395/455 |
| 5,287,484 | 2/1994 | Nishii et al. | 395/448 |
| 5,287,537 | 2/1994 | Newmark et al. | 395/800 |
| 5,369,753 | 11/1994 | Tiplex | 395/449 |
| 5,426,765 | 6/1995 | Stevens et al. | 395/458 |
| 5,428,799 | 6/1995 | Woods et al. | 395/725 |

FOREIGN PATENT DOCUMENTS

| | | |
|---|---|---|
| 3621321A1 | 3/1987 | Germany . |
| 3832912A1 | 5/1989 | Germany . |
| 4005319A1 | 8/1990 | Germany . |
| 4030629A1 | 4/1992 | Germany . |
| 4037332A1 | 5/1992 | Germany . |
| 4234695A1 | 4/1993 | Germany . |
| WO 90/03002 | 3/1990 | WIPO . |
| WO 91/03785 | 3/1991 | WIPO . |

OTHER PUBLICATIONS

IMB Technical Disclosure Bulletin, J.A. Weiss and B.E. Willner, Shared Cache in a Checkpoint Environment, Apr. 1983, vol. 25, No. 11B, pp. 5960–5961.

IEEE Journal of Solid–State Circuits, Kunio Uchiyama, Hirokazu Aoki, Osamu Nishii, Susumu Hatano, Osamu Nagashima, Kanji Oishi, and Jun Kitano, Design of a Second–Level Cache Chip for Shared–Bus Multimicroprocessor Systems, Apr. 1991, vol. 26, No. 4, pp. 566–571.

Computer, Per Stenstrom, Lund University, A Survey of Cache Coherence Schemes for Multiprocessors, Jun. 1990, pp. 12–24.

IBM Technical Disclosure Bulletin, Reduction of Cache Coherence Traffic in MP Systems Via Large Block Authority, Jul. 1990, vol. 33, No. 2, pp. 398–406.

Computer, David Chaiken, Craig Fields, Kiyoshi Kurihara, and Anant Agarwal, Massachusetts Institute of Technology, Directory–Based Cache Coherence in Large–Scale Multiprocessors, Jun. 1990, pp. 49–58.

Computer, Hoichi Cheong and Alexander V. Veidenbaum, University of Illinois at Urbana–Champaign, Compiler–Directed Cache Management in Multiprocessors, Jun. 1990, pp. 39–47.

Computer, Michael Dubois and Christoph Scheurich, Computer Research Institute, University of Southern California, Faye A. Briggs, Sun Microsystems, Synchronization, Coherence, and Event Ordering in Multiprocessors, Feb. 1988, pp. 9–21.

IBM Technical Disclosure Bulletin, Clean State of MP Cache Lines for Software Control, vol. 33, No. 12, May 1991, pp. 301–303.

CACHE COHERENCY WITHOUT BUS MASTER ARBITRATION SIGNALS

RELATED APPLICATION

This is a continuation of application Ser. No. 07/935,564, Aug. 26, 1992, abandoned; which is continuation-in-part of a co-pending U.S. patent application Ser. No. 07/864,399, titled "Cache Control System for Designating Non-Cacheable Regions", filed Apr. 6, 1992, and assigned to the assignee of this application also abandoned.

TECHNICAL FIELD OF THE INVENTION

The invention relates generally to data communication between asynchronous processes of a computer system so as to assure the validity of data in process-local buffers (such as caches) without reliance on cycle-by-cycle monitoring of communications between such asynchronous processes.

More particularly, the invention relates to computer architectures using cache memory, and even more particularly relates to a cache coherency system for a processor-cache combination, where the processor-cache is used in a multi-master computer system in which bus arbitration signals either are not available to the processor-cache, or are not exclusively relied on by the processor-cache to assure validity of the data in the cache.

In one aspect of the invention, the cache coherency system is implemented for a 386-bus compatible microprocessor design that incorporates an internal write-through cache, but which is used in a multi-master computer system that does not provide to the microprocessor (i.e., the processor-cache) bus master arbitration signals.

BACKGROUND OF THE INVENTION

Cache memory is commonly used to improve performance in a computer system which can be generally described as including a central processing unit (CPU), such as a microprocessor chip, memory subsystem, bus control logic, and other supporting logic. The cache may be located either external or internal to the CPU, and together with the main memory, forms the memory hierarchy of the computer system.

In a multi-master computer system, main memory may be accessed by bus masters other than the CPU, including direct memory access (DMA) devices and microcontrollers (as well as other CPUs). To maintain coherency between cache memory and main memory, the CPU typically will implement one of two cache coherency techniques: (a) bus snooping—monitoring all addressing operations to detect when another bus master has accessed cached memory locations, or (b) bus arbitration—detecting when another bus master has taken control of the system bus such that it may have accessed cacheable regions in main memory. In the case of bus arbitration, the CPU and the other bus masters use bus arbitration signals to signal which master has control of the memory bus (any bus that can access memory) and is thereby permitted to access main memory—to ensure cache coherency, the CPU invalidates (or flushes) all or part of the cache when another bus master takes control of the bus.

Without limiting the scope of the invention, this background information is provided in the context of a specific problem to which the invention has application: ensuring cache coherency for a 386-bus compatible microprocessor design that incorporates an internal write-through cache, but which is used in a multi-master computer system with external cache where bus master arbitration signals HOLD and HLDA are used by the external cache controller to maintain cache coherency, but are not available for use by the microprocessor.

Briefly, the 386 bus architecture supports pipelined and nonpipelined bus cycles. The bus architecture for the later-generation 486 microprocessor supports burst mode addressing, but does not support pipelining. In addition, the 486 bus architecture supports the internal cache of the 486 microprocessor, while the 386 bus architecture supports external cache implementations, but does not include support for an internal cache. As a result, the higher-performance 486 microprocessor is not compatible with conventional 386-based computer systems.

Thus, for existing 386-based computer systems, the performance benefits of cache memory can only be obtained by implementing external cache. An alternative approach would be to design a microprocessor architecture that included internal cache but was still compatible with the 386 bus architecture.

The problem with this approach is maintaining compatibility with existing x86 software, and in particular, executing 8086 software in real mode. The 8086 microprocessor was designed with an address space of 1 Mbyte (twenty address bits A0-19). However, due to the way addresses were calculated, the 8086 could internally generate addresses for the 64 Kbytes above 1 Mbyte, but these addresses were clipped to 20 bits—a scheme known as wrap around addressing. Thus, a computer system designed to execute 8086 software must support 8086 real mode addressing including 8086 wrap around addressing.

The 386 microprocessor does not implement wrap around addressing, in 8086 or any other mode—internal addresses for the region above 1 Mbyte require 21 address bits. Current 386-based computer systems emulate the 8086 real mode addressing by incorporating address generation logic that, when enabled for 8086 real mode addressing, masks (forces low) the address bit A20. With A20 masked, accesses to the region above the 1 Mbyte boundary wrap around to the bottom of the address space, emulating the 8086 wrap around.

FIG. 1a illustrates a 386-based computer system including supporting A20M logic 2 for implementing 8086 real mode addressing. With the A20M logic enabled, address bit A203 of the normal 386 address is masked prior to being input to main memory, and if applicable, the external cache. Thus, the A20 masking operation of the computer system is transparent to the 386 microprocessor.

In contrast, the 486 microprocessor emulates 8086 real mode addressing by providing for an A20M mask signal input through an A20M pin 4. FIG. 1b illustrates this pin configuration. When the A20M signal input is asserted, the 486 microprocessor 5 masks address bit A20 when driving the external address bus, and when performing an internal cache access. The KEN (cache enable) pin 6 is used to indicate whether the data being returned during the current bus cycle is cacheable.

A third approach is to design a 386-compatible microprocessor that supports A20M and/or KEN signaling, allowing the microprocessor to incorporate internal cache in the manner of the 486 microprocessor. However, such a non-conventional design for a 386-microprocessor would not be compatible with existing designs for 386-based computer systems, because those systems do not support A20M or KEN signaling. Thus, the 486 approach does not offer a practical solution for implementing a microprocessor with internal cache while supporting 8086 real mode addressing, including 8086 wrap around addressing, for use in an existing 386-based computer system.

Another problem with designing a 386-class microprocessor with an internal cache is maintaining cache coherency when used in multi-master computer systems. Multiple master computer systems are comprised of multiple asynchronous processes running simultaneously. At a microscopic level, cache management policy is to use bus snooping to monitor each bus cycle, and (a) invalidate cache entries that correspond to writes to the primary cache originated by any master other than the microprocessor, and (b) supply data to all read hits (although supplying data is not required if the cache is write-through because main memory is current on writes).

If bus snooping is not used, the microprocessor would normally use the bus arbitration signals HOLD and HLDA to implement cache coherency by invalidating the cache when another bus master has taken control of the memory bus. However, because the 386-bus architecture supports cache implemented between the 386 microprocessor pins and main memory, but not between the CPU core of the 386 microprocessor and the microprocessor pins (i.e., internal to the microprocessor chip), implementing on-chip cache in a 386-bus and pin compatible microprocessor requires an innovative cache coherency policy.

That is, some 386-based multi-master computer systems do not make available to the microprocessor socket all the bus arbitration signals, at least to the extent that bus mastership, address-type, data-type, and cycle-type cannot be completely determined for every cycle by examining those signals that are available. For example, some or all bus arbitration signals may only be available to the IBM or IBM compatible personal computer (PC) chipset, or an external cache controller. Thus, for a microprocessor designed to be compatible with these computer systems, bus arbitration signals could not be used to reliably maintain coherency of an internal cache.

Moreover, while some 386-based computer systems do provide bus arbitration signals to the CPU socket, they do not support hidden memory refresh, but rather use HOLD and HLDA to coordinate memory refresh operations. Installing a microprocessor with internal cache in such a computer system, and using the bus arbitration signals for cache invalidation, would cause a significant degradation in performance.

It is therefore a specific object of the invention to provide a system to maintain cache coherency for the internal cache of a microprocessor designed for use in a multi-master computer system where bus arbitration signals either are not available to the processor-cache, or cannot be reliably used (or otherwise are not used) by the processor-cache to assure validity of the data in the cache. It is a more general object to provide a method of data communication between asynchronous processes of a computer system so as to assure the validity of data in process-local buffers without reliance on cycle-by-cycle monitoring of communications between such asynchronous processes.

SUMMARY OF THE INVENTION

The invention is a method of data communication between asynchronous processes of a computer system so as to assure the validity of data in process-local buffers without reliance on cycle-by-cycle monitoring of communications between such asynchronous processes.

In one embodiment, the invention is a cache coherency system for the combination of a processor and a primary cache, the processor-cache being used in a multi-master computer system in which bus arbitration signals either are not available to the processor-cache, or are not exclusively relied on by the processor-cache to assure validity of the data in the cache. For example, the computer system may use an external (secondary) cache implementation in which bus arbitration signals are only connected to and used by the secondary cache controller. In this case, the processor-cache has no access to the bus arbitration signals, and cannot rely on conventional means to assure validity of data in the primary cache.

In one aspect of the invention, the data communication method involves: (a) for at least one selected process with a process-local buffer, detecting selected synchronization events in which a sending process communicates to a receiving process that valid data is available; and (b) in response to each such synchronization event, invalidating at least a portion of the data entries in such process-local buffer. As a result, data entries in such process-local buffer are assured of being correctly designated valid or invalid for subsequent accesses.

In another aspect of the invention, a cache coherency system comprises synchronization detection logic and cache invalidation logic. The synchronization detection logic detects bus master synchronization events indicating that bus masters other than the processor may have accessed main memory. The cache invalidation logic is responsive to selected synchronization events to invalidate at least part of the data entries in the cache. As a result, a cache miss will occur in response to subsequent accesses to such invalidated cache data entries.

In still another aspect of the invention, the method of implementing a cache coherency system involves: (a) detecting selected synchronization events which are associated with accesses (reads or writes) to shared memory, and which indicate when valid data is available, and (b) in response to each such synchronization event, invalidating at least part of the data entries in the cache. As a result, a cache miss will occur in response to subsequent accesses to such invalidated cache data entries.

Thus, the cache coherency technique of the invention uses a macroscopic policy based on detecting synchronization events indicating that coherency invalidating events may have occurred. Coherency is achieved by ensuring that the processor's primary cache either has the most current copy of the contents of main memory, or is marked invalid when any asynchronous process that is changing memory sends a message (i.e., a synchronization event) that valid data is available, thereby signalling completion of requested transfers.

In an exemplary embodiment of the invention, the cache coherency system is used to provide cache coherency for a 386-bus compatible microprocessor with an internal write-through cache. The microprocessor/cache coherency system can be installed in a multi-master computer system that implements an external (secondary) cache where bus arbitration signals (HOLD and HLDA) are only used by the external cache controller. The computer system uses the PC bus architecture.

The exemplary cache coherency system comprises two PLAs (programmed logic arrays)—a FLUSH module and a WAVESHAPING module. The FLUSH module (a) receives selected bus cycle definition and control signals from the microprocessor, (b) detects FLUSH (cache invalidation) conditions, i.e., bus master synchronization events, and for each such FLUSH condition, (c) provides a FLUSH output signal. The WAVESHAPING module receives the FLUSH signals and provides a corresponding CPU/FLUSH signal to the microprocessor with the appropriate set up and hold time.

The CPU/FLUSH output of the WAVESHAPING module is coupled to a FLUSH pin on the microprocessor (one of the no-connect pins on the standard 386 pinout)—designated the FLUSH# pin. In response to a CPU/FLUSH signal, the microprocessor executes a cache flush operation by invalidating the contents of the internal cache.

For the exemplary cache coherency system (using the PC bus architecture), the bus master synchronization events, or FLUSH conditions, that cause cache invalidation are: (a) hardware generated interrupts, and (b) read or read/write accesses to input output (I/O) address space, except for those directed to a hard disk or an external coprocessor. The specific bus master synchronization events to be detected as FLUSH conditions may be made programmable to optimize the cache coherency function. In addition, if the computer system uses the (IBM) microchannel bus architecture such that memory-mapped I/O rather than I/O space is used for polled I/O synchronization of events between bus masters, the bus master synchronization events can include accesses to selected regions of memory-mapped I/O space.

The technical advantages of the invention include the following. The general data communication method relies on detecting synchronization events between asynchronous processes of a computer system to assure the validity of data in process-local buffers (such as caches) without reliance on cycle-by-cycle monitoring of communications between such asynchronous processes. When used to implement a cache coherency system, this technique enables a 386-bus compatible microprocessor with internal cache (write-through or write-back) to be designed for general use in 386-based computer systems, including those multi-master systems where bus master arbitration signals are not available to the microprocessor, or if available, cannot be reliably used (or otherwise are not used) for cache coherency purposes. The system detects bus master synchronization events in which bus master communications could result in cache incoherency—that is, the system uses a macroscopic policy based on detecting the messages indicating that coherency invalidating events may have occurred. The system can be implemented using external cache coherency chip(s), or the cache coherency functionality can be integrated into the microprocessor chip—for the external implementation, the microprocessor and cache coherency chips can be included on a printed circuit board that in turn can be installed into the existing microprocessor socket of the computer system without requiring any motherboard redesign to provide either bus arbitration signals, or cache invalidation signals. The system can be used with computer systems based either on the PC USA or EISA) or microchannel bus architecture.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DETAILED DESCRIPTION OF THE INVENTION

Figure 2:
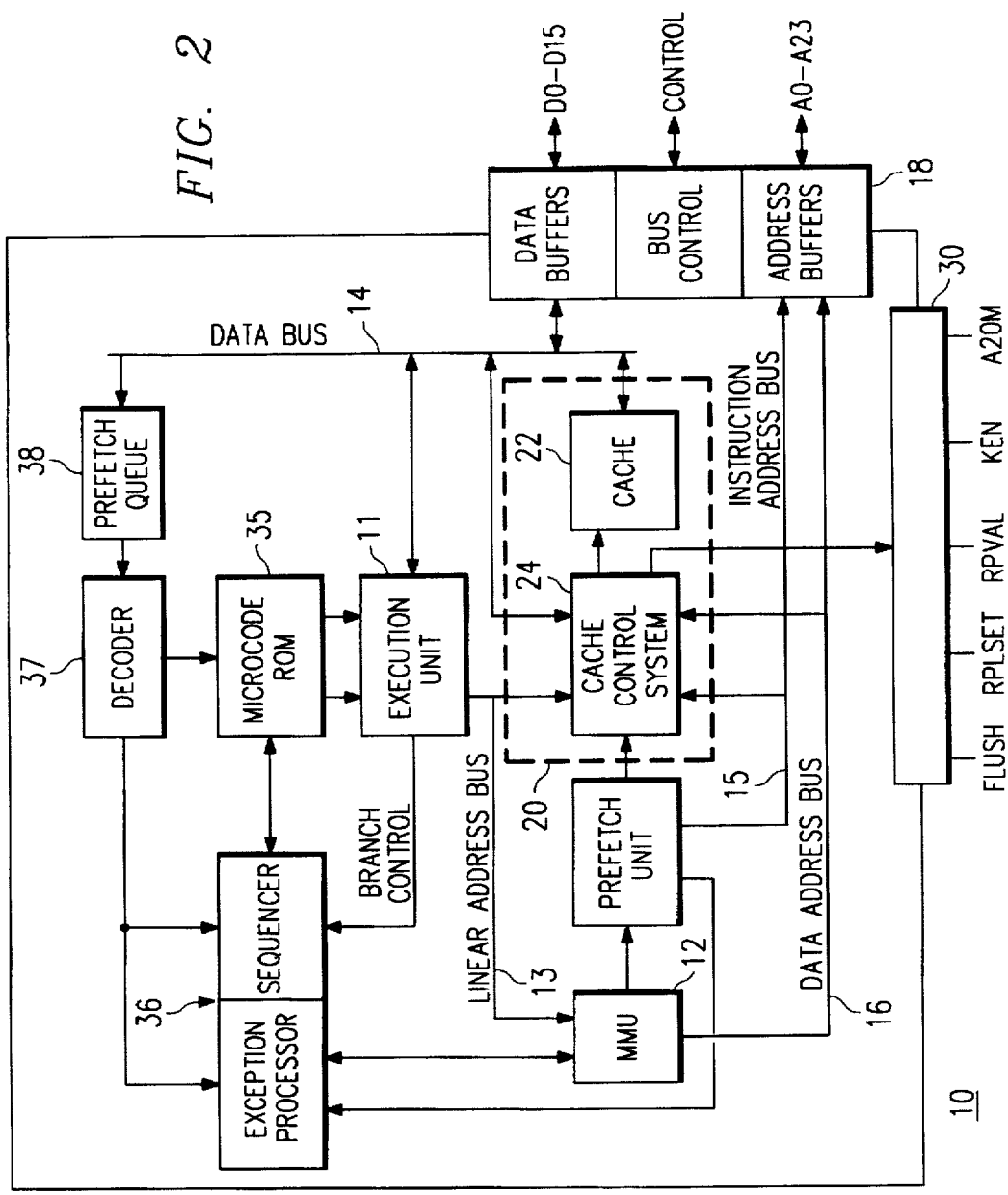
FIG. 2 is a general block diagram of a microprocessor including the Cache Control System.
Figure 1A:
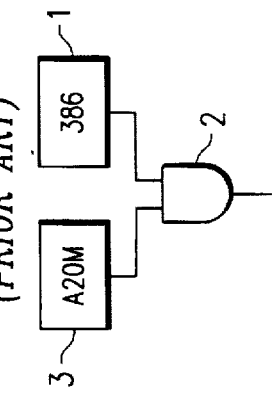
FIGS. 1a and 1b respectively illustrate existing 386 and 486 approaches to implementing 8086 real mode addressing.
Figure 1B:
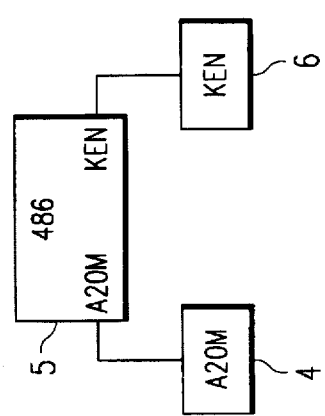

The detailed description of an exemplary embodiment of the cache control system and the cache coherency system is organized as follows:

1. Cache Control System
2. Cache Control Registers
   2.1. Cache Configuration Registers
   2.2. Non-Cacheable Region Registers
   2.3. Cache Control and Status Pins
3. Cache Control Operations
   3.1. Cache Addressing
   3.2. Cache Invalidation
   3.3. Cache Control and Status Signaling
4. Cache Coherency System
   4.1. Synchronization events
      4.1.1. Hardware Generated Interrupts
      4.1.2. I/O Reads
      4.1.3. Memory-Mapped I/O Reads
   4.2. FLUSH Module
   4.3. WAVESHAPING Module
   4.4. Alternative On-Chip Implementation
5. Conclusion APPENDIX—Test Vectors This organizational table, and the corresponding headings used in this detailed description, are provided for convenience of reference only.

The exemplary cache control system is used to control the internal cache of a microprocessor compatible with conventional 386-based computer systems, i.e., computer systems using the 386 bus architecture without support for either A20M# or KEN# signaling (the symbol # indicates inverse or complement). The microprocessor uses 32-bit internal and 16-bit external data paths, with a 24-bit external address, which for 386-based computer systems is commonly designated as the SX bus. Alternatively, the exemplary embodiment could have been described in connection with a computer system using the DX bus which has 32-bit external data and address buses. The exemplary cache coherency system is combined with an exemplary microprocessor with internal write-through 1K cache. The cache coherency system supports installation of the combined microprocessor/ cache coherency system into the microprocessor socket of multi-master computer systems in general, and in particular, those systems in which bus arbitration signals are not available for use by that socket, or if available, do not reliably indicate in conjunction with the microprocessor's bus control signals the precise nature of every bus cycle that occurs in the computer system. The exemplary computer system (a) includes an external cache implementation in which only the external cache controller has is able to use bus arbitration signals to maintain cache coherency, and (b) uses the DX 32-bit PC (ISA or EISA) bus architecture. The exemplary microprocessor includes a FLUSH# pin that is one of the no-connect pins of the standard 386 pinout.

The exemplary cache coherency system is also applicable to any cache design, and to any cache size or organization, although different implementation and performance issues are involved depending on whether the cache design is write-through or write-back. While cache invalidation for write-through caches merely involves marking the contents of the cache invalid, cache invalidation for write-back caches requires a cache-flush operation in which the cache contents are first written back to main memory, and then marked invalid. Thus, using the cache coherency system with a write-back cache might result in performance degradation due to excessive flush activity in systems that produce an abundance of synchronization events. Another application where use of the cache coherency system with a write-through cache is probably preferred is in symmetrical multi-processing (SMP) environments, where the processors rely on the assumption that main memory always holds valid data—a write through policy would probably yield better performance, as well as conformance with the system assumption of memory validity. At present, the SMP environment is not supported by most conventional operating systems (MS-DOS, UNIX, OS2, WINDOWS).

Notwithstanding the technical distinction between cache invalidation and cache flush, the term "flush" is often used by those skilled in the art to describe both operations—invalidation of write-through caches and write-back-then-invalidate for write-back caches. This detailed description uses the terms flush and invalidate interchangeably.

1. Cache Control System. FIG. 2 illustrates the exemplary implementation of the cache control system in a microprocessor with internal cache. The microprocessor chip is designated generally as 10, and includes an internal cache memory system 20.

The microprocessor 10 includes an execution unit 11 and a memory management unit (MMU) 12. The execution unit outputs linear (virtual) addresses over an internal linear address bus 13, while data transfers occur over an internal data bus 14. In addition, the microprocessor 10 includes a microcode ROM 35, an exception processor and sequencer 36, decoder 37 and prefetch queue 38 connected in conventional manner as indicated in FIG. 2.

The MMU converts linear addresses to physical addresses, which output over separate internal instruction and data address buses 15 and 16. The physical addresses are provided both (a) to the cache memory system 20, and (b) to address buffers 18 which interface to the external address bus A0-23.

The cache memory system includes a cache 22 and a cache control system 24. The cache control system receives physical addresses off the internal instruction and data address buses 15 and 16 (together with the lower order bits of the linear address, which are not translated in the MMU). In addition, the cache control system is able to receive data from the internal data bus 14.

The exemplary cache 22 is a 1 Kbyte unified (instruction and dam) write-through cache with 256 cache lines of 4 bytes each, corresponding to a 32-bit internal data path. The cache can be organized as either direct mapped or two-way set associative. When organized as two-way set associative, the cache is separated into two banks of 128 cache lines. The organization and operation of the cache is conventional.

The cache control system 24 provides cache addresses to the cache 22, and cache configuration signals that enable/disable control and status pins 30 associated with cache operations. Both cache addresses and the cache configuration signals are generated based on cache control information loaded under software control into the cache control system (specifically into cache control registers).

In particular, the cache control system 24 stores cache control information used to define non-cacheable regions of the address space. For example, the cache control information may define as non-cacheable the first 64 Kbytes above each 1 Mbyte boundary, thereby enabling the microprocessor 10 to support 8086 real mode addressing (without requiring either A20M# or KEN# signaling from the computer system).

For each physical address from the MMU, the cache control system determines whether the address is directed to a non-cacheable region of the address space based on the cache control information currently stored in the cache control system. Accesses to non-cacheable regions will be treated as cache misses, requiring external bus cycles, but will not result in cache fills.

Figure 3:
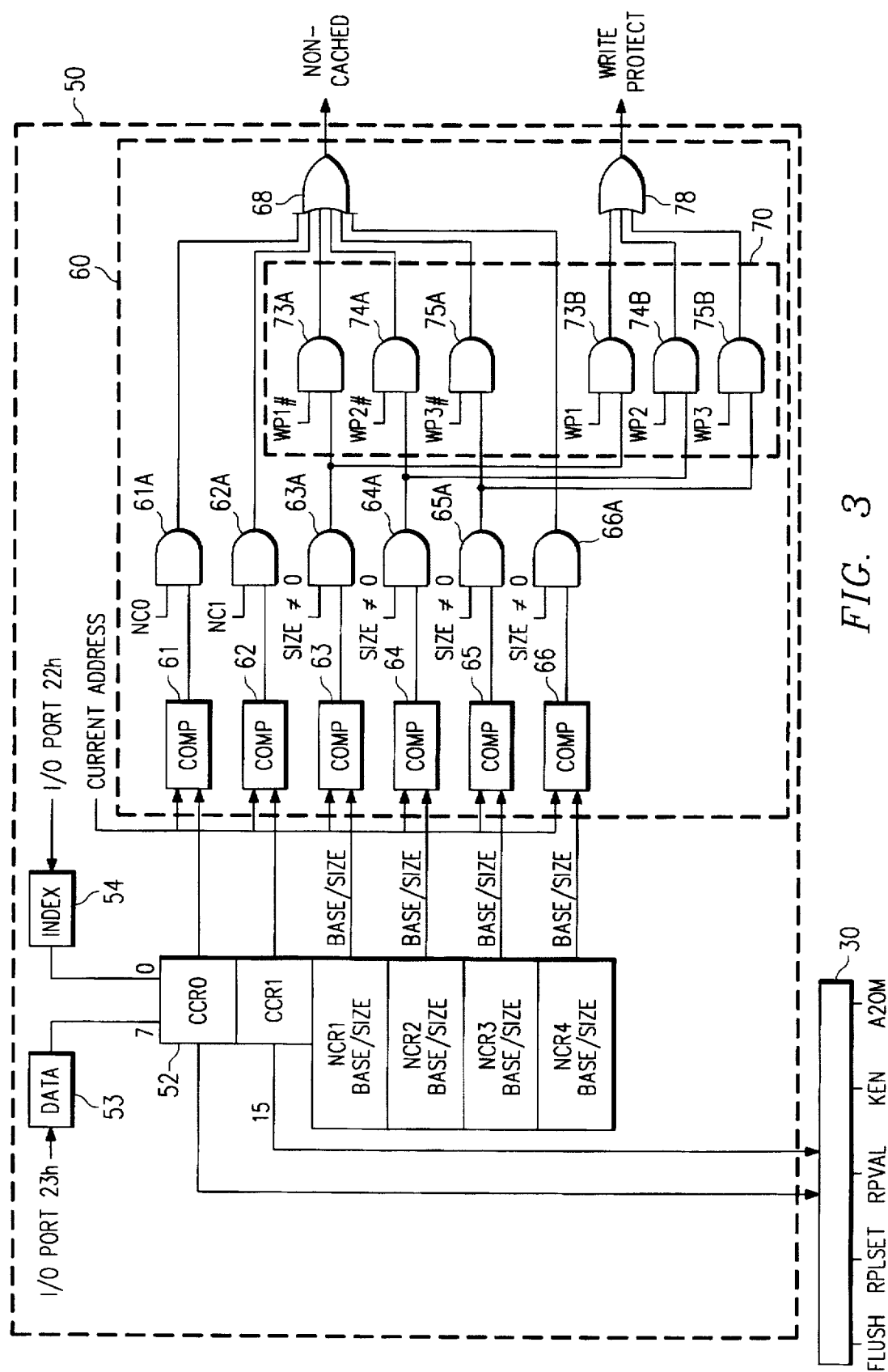
FIG. 3 is a more detailed block diagram of the Cache Control System, illustrating the cache control registers, and the supporting logic for loading the cache control registers, and for controlling cache operations.

FIG. 3 illustrates the cache control system in greater detail. The cache control system 50 includes six on-chip cache control registers 52: two 8-bit cache configuration registers CCR0 and CCR1, and four 16-bit non-cacheable region registers NCR1-NCR4. Cache control information is written into the cache control registers using I/O ports 22h and 23h. Access to the cache control registers 52 is achieved by writing the address (referred to as the index) of the cache control register to I/O port 22h, with interface to the internal data bus being provided by an index register 54. Data is then written or read from the specified cache control register through I/O port 23h, with interface to the internal data bus being provided by a data register 53. Each I/O port 23h operation must be preceded by an I/O port 22h operation, otherwise the second and later I/O port 23h operation will be directed off-chip and not affect stored control information. Access to I/O port 22h with an index outside of the address range assigned to the cache control registers (C0-CFh) will result in external bus cycles and will not affect any control information stored in the on-chip cache control registers. Based on the stored cache control information, the cache control system generates cache address control signals using cache address control logic 60. In addition, cache configuration signals enable/disable the control and status pins 30: A20M#, KEN#, RPLSET#, RPLVAL#, and FLUSH#.

The cache address control logic 60 includes six non-cacheable region comparators 61–66, the first two of which are associated with the NC0 and NC1 bits of CCR0, and the last four of which are associated respectively with NCR1–NCR4. The output of each comparator is gated by a respective AND gate 61A–66A, with the gated outputs being applied to a NOR gate 68 (in the case of comparators 63–65, through the write protect logic 70). The gated outputs of three of the non-cacheable region comparators 63–65, which are associated with non-cacheable region registers NCR1–NCR3, are also applied to write protect logic 70. Specifically the three comparator outputs are applied to two sets of AND gates 73A–75A and 73B–75B, associated with respective non-cacheable region registers NCR1–NCR3. The gated outputs are applied respectively to the NOR gate 68 and to a NOR gate 78.

The operation of the cache address control logic in controlling cache addressing is described in Section 3.1.

2. Cache Control Registers. The cache control registers—cache configuration registers CCR0–1 and non-cacheable region registers NCR1–4—are loadable under software control with cache control information.

The register index assignments for the cache control registers are indicated in Table 1.

TABLE 1

Cache Control Register Index Assignments

| Register Name | Register Index | Number of Bits in Register |
|---|---|---|
| CCR0 | C0h | 8 |
| CCR1 | C1h | 8 |
| NCR1 | C5h–C6h | 16 |
| NCR2 | C8h–C9h | 16 |
| NCR3 | CBh–CCh | 16 |
| NCR4 | CEh–CFh | 16 |

2.1. Cache Configuration Registers. Bit assignments for the Cache Configuration Registers CCR0 and CCR1 are listed in Tables 2A and 2B.

TABLE 2A

Cache Configuration Register CCR0 Bit Assignments

| Register Name | Register Index | Bits | Description |
|---|---|---|---|
| CCR0 | C0h | 0 | NCO: If = 1, sets the first 64 Kbytes at each 1 Mbyte boundary as non-cacheable. |
| | | 1 | NC1: If = 1, sets 640 Kbytes to 1 Mbyte region as non-cacheable. |
| | | 2 | A20M: If = 1, enables A20M# input pin. |
| | | 3 | KEN: If = 1, enables KEN# input pin. |
| | | 4 | FLUSH: If = 1, enables FLUSH# input pin. |
| | | 5 | BARB: If = 1, enables flushing of internal cache when hold state is entered. |
| | | 6 | CO: Selects cache organization: 0 = 2-way set associative 1 = direct-mapped |
| | | 7 | SUSPEND: If = 1, enables SUSP# input and SUSPA# output pins. |

TABLE 2B

Cache Configuration Register CCR1 Bit Assignments

| Register Name | Register Index | Bits | Description |
|---|---|---|---|
| CCR1 | C1h | 0 | RPL: If = 1, enables output pins RPLSET and RPLVAL#. If not enabled, outputs RPLSET and RPLVAL# will float. |
| | | 1–3 | Reserved |
| | | 4 | WP1: If = 0, NCR1 defines a non-cacheable region. If = 1, NCR1 defines a cacheable but write protected address region. Reset state = 0. |
| | | 5 | WP2: If = 0, NCR2 defines a non-cacheable region. If = 1, NCR2 defines a cacheable but write protected address region. Reset state = 0. |
| | | 6 | WP3: If = 0, NCR3 defines a non-cacheable region. If = 1, NCR3 defines a cacheable but write protected address region. Reset state = 0. |
| | | 7 | Reserved |

All bits are cleared to 0 at reset, except C6h which defaults to 0Fh to set the first non-cacheable region size to be 4 Gbytes.

In cache configuration register CCR0, non-cacheable bit NC0 is used to enable caching when the microprocessor is operating in 8086 real mode, without requiring either A20M# or KEN# signaling from the computer system (i.e., without requiring address bit A20 to be masked for the internal cache). When active, this non-cacheable bit defines the first 64 Kbytes at each 1 Mbyte boundary as non-cacheable. As a result, the microprocessor automatically does not cache accesses to those regions, thereby preventing data within the wrap-around memory area from residing in the internal cache. This feature enables the use of external 8086 mode wrap around addressing by preventing memory aliasing between the first 64 Kbytes of cache, and the 64 Kbytes above 1 Mbyte.

Also in cache configuration register CCR0, non-cacheable bit NC1 is used to define as non-cacheable the region of the address space between 640 Kbytes and 1 Mbyte. This region is commonly used by software designers for such functions as VGA and memory-mapped I/O (which should not be cached).

In cache configuration register CCR1, write-protect bits WP1–WP3 (bit positions 4–6) are used to designate the address regions defined by non-cacheable region registers NCR1–NCR3 as either non-cacheable, or in the alternative, as write protected. If any of these write-protect bits is set, then the corresponding region of address space defined in the associated non-cacheable region register will be cacheable but write protected.

2.2. Non-Cacheable Region Registers. Bit assignments for the non-cacheable region registers NCR1–4 are listed in Table 3A. The non-cacheable regions NCR1–4 are defined by a base (or starting) address field and a 4-bit block size field. The size of the non-cacheable regions range from 4 Kbyte to 4 Gbyte as shown in Table 3B.

TABLE 3A

Non-Cacheable Region Register Bit Assignments

| Register Name | Register Index | Bits | Description |
|---|---|---|---|
| NCR1 | C5h | 7–0 | Address bits A23–A16 of Region 1 starting address |
| | C6h | 7–4 | Address bits A15–A12 of Region 1 starting address |
| | | 3–0 | Size of non-cacheable Region 1 (Table 3B) |
| NCR2 | C8h | 7–0 | Address bits A23–A16 of Region 2 starting address |
| | C9h | 7–4 | Address bits A15–A12 of Region 2 starting address |
| | | 3–0 | Size of non-cacheable Region 2 (Table 3B) |
| NCR3 | CBh | 7–0 | Address bits A23–A16 of Region 3 starting address |
| | CCh | 7–4 | Address bits A15–A12 of Region 3 starting address |
| | | 3–0 | Size of non-cacheable Region 3 (Table 3B) |
| NCR4 | CEh | 7–0 | Address bits A23–A16 of Region 4 starting address |
| | CFh | 7–4 | Address bits A15–A12 of Region 4 starting address |
| | | 3–0 | Size of non-cacheable Region 4 (Table 3B) |

Note that the non-cacheable region registers are allocated for a 24-bit physical address—if a 32-bit physical address is used, the register allocation would be expanded to accommodate address bits 31–24 (with a corresponding register index).

TABLE 3B

Size of Non-Cacheable Regions

| Bits 3–0 | Non-Cacheable Region Size | Bits 3–0 | Non-Cacheable Region Size |
|---|---|---|---|
| 0000 | Disabled | 1000 | 512 Kbytes |
| 0001 | 4 Kbytes | 1001 | 1 Mbytes |
| 0010 | 8 Kbytes | 1010 | 2 Mbytes |
| 0011 | 16 Kbytes | 1011 | 4 Mbytes |
| 0100 | 32 Kbytes | 1100 | 8 Mbytes |
| 0101 | 64 Kbytes | 1101 | 16 Mbytes |

TABLE 3B-continued

Size of Non-Cacheable Regions

| Bits 3–0 | Non-Cacheable Region Size | Bits 3–0 | Non-Cacheable Region Size |
|---|---|---|---|
| 0110 | 128 Kbytes | 1110 | 32 Mbytes |
| 0111 | 256 Kbytes | 1111 | 4 Gbytes |

The block size of 4 Gbytes represents the entire address space of 386/486 microprocessors. Thus, specifying a block size of 4 Gbytes in effect disables caching for all microprocessor addressing operations. This technique for disabling caching is useful for computer systems in which the microprocessor is powered up in the cache-on mode, but for various reasons caching needs to be disabled—configuring the cache with the entire 4 Gbytes address space non-cacheable effectively disables caching.

Also, note that, for a given region of address space, specifying a block size field of 0 effectively prevents addresses in that region register from being designated as non-cacheable.

2.3. Cache Control and Status Pins. Referring to FIG. 3, the exemplary embodiment of the microprocessor provides cache control and status pins that, if supported by the computer system, can be used by the cache control system to provide additional modes of controlling and interfacing to the cache. These pins are: A20M#, KEN#, RPLSET, RPLVAL#, and FLUSH#.

The signal inputs supported by the microprocessor pin-out are listed in Table 4.

TABLE 4

Cache Control and Status Signals

| Signal | Description |
|---|---|
| A20M# | Input which forces address bit 20 (A20) low. Used to emulate 8086 memory address wrapping at the 1 Mbyte boundary. Both the A20 input to the internal cache and the external A20 pin are forced low when A20M# is active. A20M# is disabled as a result of RESET and is enabled by setting bit 2 of the CCR0 (Cache Configuration Register 0). This input is ignored when paging is enabled. |
| KEN# | Input which enables the microprocessor to cache data associated with the current memory read bus cycle, except for accesses to non-cacheable regions as defined by the Cache Configuration Registers. KEN# is disabled as a result of RESET and enabled by setting bit 3 of CCR0. |
| RPLSET | Output that indicates which Set in the internal cache is being replaced. RPLSET = 0 indicates Set 0. RPLSET = 1 indicates Set 1. When the cache is direct mapped RPLSET = 0. RPLSET is a tri-state output that is disabled as a result of RESET and enabled by setting bit 0 of CCR1. |
| RPLVAL# | Output which indicates that RPLSET is valid. RPLVAL# is a tri-state output that is disabled as a result of RESET and is enabled by setting bit 0 of CCR1. |
| FLUSH# | Input which flushes (invalidates) all cache memory locations. FLUSH# is disabled as result of RESET and is enabled by setting bit 4 of CCR0. |

As discussed in the Background, computer systems based on the 486 microprocessor can use either A20M# or KEN# signaling to control cache operations when operating in 8086 real mode, including supporting 8086 wrap around addressing. When the computer system emulates 8086 wrap-around addressing and data within the 64 KByte wrap-around area resides in the microprocessor internal cache, the internal cache addressing must also be forced to emulate the 8086 wrap-around. While the exemplary microprocessor supports A20M and KEN, because of the cache control system, these signaling modes are not required to support 8086 real mode addressing.

Address Bit 20 Mask (A20M#) causes the microprocessor to mask (force low) physical address bit 20 when driving the external address bus or performing an internal cache access. A20M# can be enabled using the A20M bit in the configuration register CCR0. When the microprocessor is in 8086 real mode, asserting the A20M# emulates the 1 Mbyte address wrap around that occurs on the 8086. The A20 signal is never masked when paging is enabled regardless of the state of the A20M# input and the state of the CCR control bit. The A20M# input is ignored following reset.

Cache Enable (KEN#) indicates that the data being returned during the current cycle is cacheable. KEN# can be enabled using the KEN bit in the cache configuration register CCR0. When KEN# is active and the microprocessor is performing a cacheable code fetch or memory data read cycle, the cycle is transformed into a cache fill. Use of the KEN# input to control caching is optional. The non-cacheable region registers can also be used to control caching. Memory addresses specified by the non-cacheable region registers are not cacheable regardless of the state of KEN#. I/O accesses, locked reads and interrupt acknowledge cycles are never cached.

During cached code fetches, two contiguous (16-bit or two byte) read cycles are performed to completely fill the 4-byte cache line. During cacheable data reads, the microprocessor performs only those bus cycles necessary to supply the required data to complete the current operation. Valid bits are maintained for each byte in the cache line, thus allowing data operands of less than 4 bytes to reside in the cache. During any cache fill cycle with KEN# asserted, the microprocessor ignores the state of the byte enables (BHE# and BLE#) and always writes both bytes of data to the cache. The KEN# input is ignored following reset.

Replacement Set (RPLSET) is an output indicating which set in the cache is currently undergoing a line replacement. RPLSET can be enabled using the RPL bit in the cache configuration register CCR1. This signal is meaningful only when the internal cache is configured as two-way set associative. When the internal cache is configured as direct-mapped, RPLSET=0 always. The RPLSET output is disabled (tri-stated) following reset.

Replacement Set Valid (RPLVAL#) is an active low output driven during a cache fill cycle to indicate that RPLSET is valid for the current cycle. RPLVAL# can be enabled using the RPL bit in the cache configuration register CCR1. RPLVAL# and RPLSET provide external hardware the capability of monitoring the cache LRU replacement algorithm. The RPLVAL# output is disabled (tri-stated) following reset.

Cache Flush (FLUSH#) is an active low input which invalidates (flushes) the entire cache. FLUSH# can be enabled using the FLUSH bit in the CCR0 configuration register. Use of FLUSH# to maintain cache coherency is optional. The cache may also be invalidated during each hold acknowledge cycle by setting the BARB bit in the cache configuration register CCR0. The FLUSH# input is ignored following reset.

Thus, for computer systems that permit DMA (direct memory access), the exemplary microprocessor can operate in the cache enabled mode if the computer system provides either FLUSH or HOLD signaling to the microprocessor, thereby enabling the cache control system to invalidate the cache following DMA accesses to memory.

3. Cache Control Operation. When caching is enabled, the microprocessor will cache any unlocked memory data read cycle. The cache control system ensures that the microprocessor automatically does not cache accesses to regions of the memory address space defined as non-cacheable by the cache control information stored in the cache control registers—cache configuration registers CCR0–1 and non-cacheable region registers NCR1–4.

3.1. Cache Addressing. Referring to FIG. 3, the cache address control logic 60 includes non-cacheable region comparators 61–66. Each comparator receives (a) the current physical address input to the cache, and (b) a non-cacheable region output from a respective cache configuration register CCR0–1 or non-cacheable region register NCR1–4.

Comparator 61 receives the NC0 bit from cache configuration register CCR0, while comparator 62 receives the NC1 bit from the same register. (See, Table 3A.) If either, or both, of these bits is set, thereby defining the corresponding region of address space as non-cacheable, then the associated comparator output will indicate that the current address is non-cacheable if it is within such non-cacheable region. The outputs of these comparators are gated by the respective AND gates 61A–62A, with the NC0 and NC1 register bits providing the gating signal.

Comparator 63 receives from non-cacheable region register the base/size data that defines a corresponding non-cacheable region of address space. (See, Tables 3A and 3B) The comparator output will indicate that the current address is non-cacheable if it is within such non-cacheable region. The output of the comparator is gated by AND gate 63A, with the size field providing the gating signal.

The operation of comparators 64–66 is analogous to that of comparator 63.

The gated outputs of comparators 61–62 and 66 are input directly to the NOR gate 68. The gated outputs of comparators 63–65 input to the write-protect logic 70.

Specifically, the gated outputs of comparators 63–65 are input to non-cacheable AND gates 73A–75A, and to write-protect AND gates 73B–75B. The non-cacheable gates 73A–75A are gated respectively by the WP1#–WP3# bits from the cache configuration register CCR1, while the write-protect gates 73B–75B are gated respectively by the complimentary WP1–WP3 bits. (See Table 2A.)

The non-cacheable gates 73A–75A pass the corresponding outputs from comparators 63–65 (associated with NCR1–3) to the NOR gate 68 when the write-protect bits WP1–WP3 in the cache configuration register CCR1 are cleared, indicating that the corresponding address region is non-cacheable. If, however, the write-protect bits are set, these comparator outputs are gated by the write-protect gates 73B–75B to the NOR gate 78.

This write-protect gating operation of the write protect logic 70 determines whether a current input address that is within an address region defined by one or more of the non-cacheable region registers NCR1–3 is non-cacheable, or is cacheable but write protected.

NOR gate 68 outputs a non-cacheable address control signal if the comparison operation indicates that the current address falls within any of the address regions defined as non-cacheable. NOR gate 78 outputs a write-protect control signal if any of the comparison operations indicate that the current address falls within any of the address regions defined as write protected. These control signals are provided to the cache (22 in FIG. 2).

For the exemplary embodiment, a non-cacheable address control signal from the cache control system is interpreted by the cache as disabling cache fills for that non-cacheable address. That is, a read operation will not be affected if it results in a cache hit (for example, if the corresponding cache line was filled and then the cache control information in the cache control registers changed). Alternatively, a non-cacheable address control signal from the cache control system could be interpreted as a miss in the case of a read operation, regardless of whether the non-cacheable address is actually in the cache.

In response to write-protect address control signals, the cache will disable writes to any cache line that has been defined as within a write-protect region. Of course, read operations for such cache lines will be processed normally.

3.2. Cache Invalidation. If the microprocessor is to be used in a computer system that supports DMA, cache coherency between the internal cache of the microprocessor and external memory should be taken into account. If the microprocessor does not support snooping (i.e., monitoring bus activity during DMA operations), then cache coherency considerations dictate that the contents of the internal cache should be invalidated when previously cached data is modified in external memory by another bus master.

The exemplary microprocessor does not support snooping. Rather, the microprocessor supports cache invalidation in response to the assertion of either HOLD or FLUSH (or the execution of the INVD and WBINVD instructions). When using HOLD signaling, cache invalidation is effected, following assertion of HLDA if the BARB bit is set in the cache configuration register CCR0. When using FLUSH, cache invalidation is effected in response to the assertion of FLUSH# if the FLUSH bit is set in cache configuration register CCR0.

With respect to FLUSH signaling, the microprocessor samples the FLUSH# input each clock cycle, and if asserted, invalidates the entire contents of the internal cache. The actual point in time where the cache is invalidated depends upon the internal state of the execution pipeline.

3.3. Cache Control and Status Signaling. If the computer system supports A20M# signaling, the microprocessor emulates 1 Mbyte wrap-around addressing if the A20M bit is set in the cache configuration register CCR0 and the A20M# input is asserted. Both the address bit 20 input to the internal cache and the external A20 pin are masked (zeroed) when the A20M#input is asserted.

The microprocessor samples the A20M# input each clock cycle, and if asserted and paging is not enabled, the cache control system masks the A20 signal internally starting with the next cache access and externally starting with the next bus cycle access. If paging is enabled, the A20 signal is not masked regardless of the state of A20M#. A20 remains masked until the access following detection of an inactive state on the A20M# pin (or the clearing of the A20M control bit).

In addition, the KEN# input can be used to enable caching of memory accesses on a cycle-by-cycle basis. The microprocessor acknowledges the KEN# input only if the KEN enable bit is set in the cache configuration register CCR0. The microprocessor samples the KEN# input each clock cycle in which READY# is sampled active. If KEN# is asserted and the current address is not defined as non-cacheable per the cache control registers, then the microprocessor fills two bytes of a line in the cache with the data present on the data bus pins. The states of BHE# and BLE# are ignored if KEN# is asserted for the cycle.

If the RPL bit in the cache configuration register CCR1 is set, then the RPLSET and RPLVAL# output signals are driven by the microprocessor during cache fill cycles. If the cache is configured as direct-mapped (the CO bit in the cache configuration register CCR0), RPLSET is always driven low. If the cache is configured as two-way set associative, RPLSET indicates which set in the cache is in the process of being replaced. RPLVAL# indicates that the microprocessor will perform a cache fill to the indicated set with the data present on the data bus pins at the time READY# is sampled active. However, if KEN# is enabled and sampled inactive, the data is not cached and the line in the set indicated by RPLSET is not overwritten.

Figure 4:
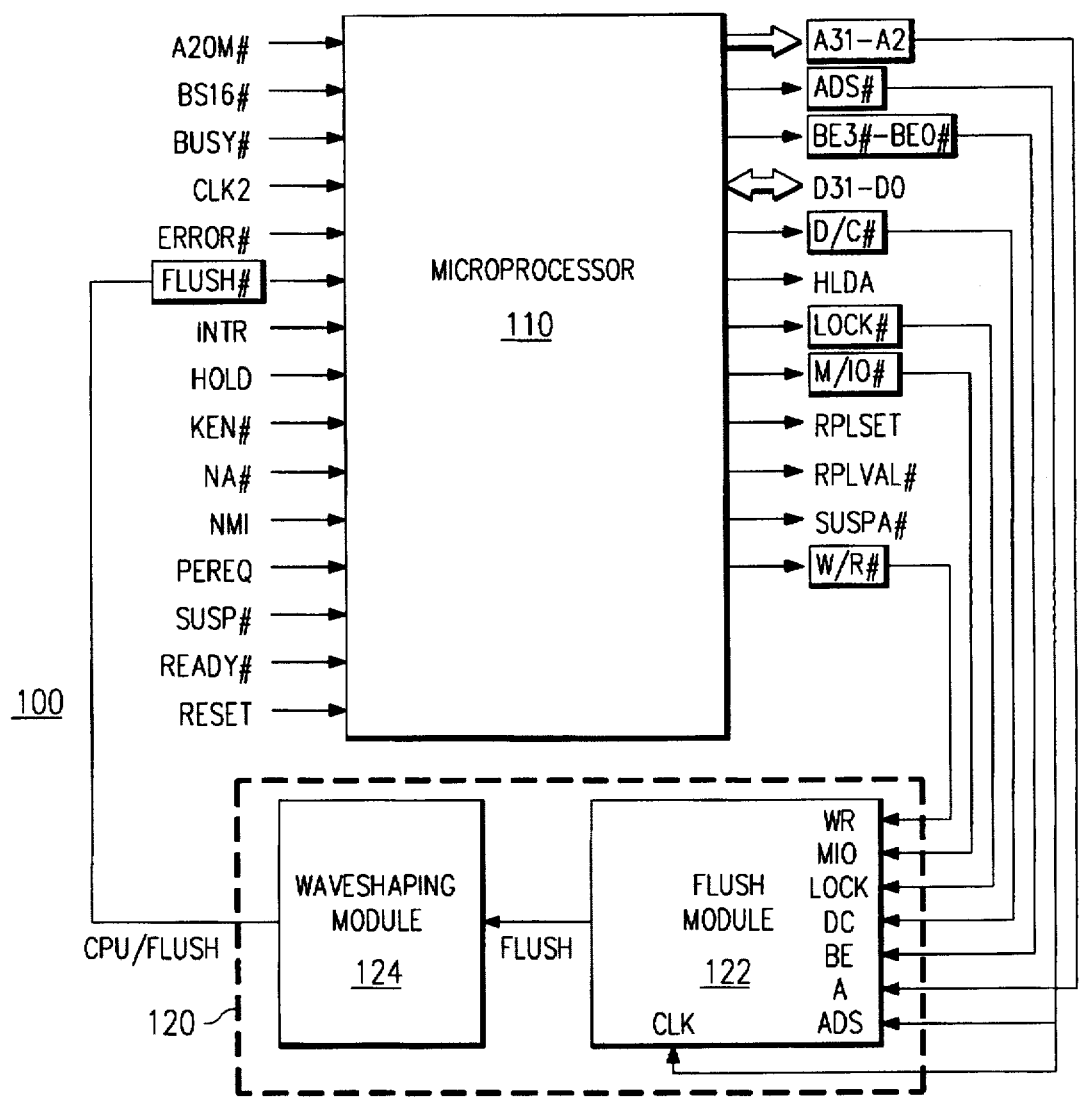
FIG. 4 is a block diagram of an embodiment of the invention illustrating the cache coherency system, including a FLUSH module and a WAVESHAPING module, used in connection with a microprocessor with internal primary cache.

4. Cache Coherency System. FIG. 4 illustrates the exemplary implementation of the cache coherency system combined with a microprocessor with internal write-through cache, forming an integrated microprocessor/cache coherency system. The microprocessor/cache coherency system is designated generally as 100, and includes a microprocessor 110 together with cache coherency logic 120 comprised of a FLUSH module 122 and a WAVESHAPING module 124.

The microprocessor is illustrated in a DX 32-bit pinout version that supports the 32-bit DX Address Bus A31-A2 plus byte enable bits BE3#-BE0# and Data Bus D31-D0. Implementation of the cache coherency system for an SX 16-bit pinout version would be a routine design modification.

Both the FLUSH module and the WAVESHAPING module were implemented by programming (see 4.2 and 4.3) reprogrammable PALs (programmed array logic). These PALs are commercially available from a number of vendors—the specific parts used for the exemplary implementation are P16V8R and P16R4, respectively. In addition, a conventional clock PAL (not shown) was used to provide a clocking signal.

For the exemplary embodiment, the cache coherency system was implemented off-chip as an upgrade to an existing microprocessor chip design —the microprocessor/ cache coherency system was incorporated onto a small printed circuit board with PGA (pin grid array) connecting pins for installation into a standard 386-class microprocessor socket. Alternatively, the cache coherency functions performed by the cache coherency system could be integrated on-chip as part of the microprocessor 110 (see, Section 4.4).

The cache coherency logic 120 performs a synchronization detection function to detect bus master synchronization events in which bus masters other than the microprocessor 110 have access to main memory (bus master communication events). When a bus master synchronization event is detected, the cache coherency logic outputs a FLUSH signal to the microprocessor 110—the microprocessor continuously samples its FLUSH input pin, and in response to FLUSH being asserted, executes a cache invalidation routine to FLUSH (invalidate) the cache, ensuring cache coherency.

Figure 5A:
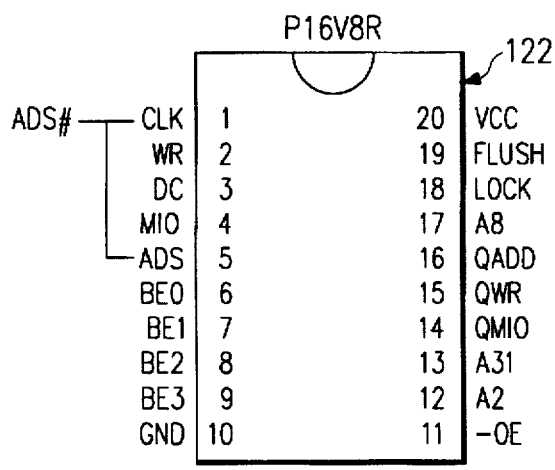
FIGS. 5a and 5b illustrate the pin-outs respectively for the FLUSH module and the WAVESHAPING module.

FIG. 5a illustrates the pinout for FLUSH module 122. The FLUSH module receives from the microprocessor 110 selected bus cycle definition and control signals and selected address lines.

The bus cycle definition signals used by the FLUSH module are Memory/IO (M/IO#), Data/Control (D/C#), Write/Read (W/R#), and LOCK#. The primary bus definition signals—M/IO#, D/C#, and W/R#—are driven valid when ADS# (Address Strobe) becomes active. LOCK# is asserted by the microprocessor 110 to deny control of the system bus to other bus masters during certain operations including interrupt to the microprocessor 10.

The bus control signal used by the FLUSH module is Address Strobe (ADS#)—the other standard bus control signals, Ready (READY#) and Next Address Request (NA#), are not used. ADS# is a three-state output indicating that the microprocessor has driven a valid address (A31-A2, BH3#-BE0#) and bus cycle definition (M/IO#, D/C#, W/R#) on the appropriate output pins.

Using these signals to define each bus cycle type, the FLUSH module detects bus master synchronization events, i.e., FLUSH (cache invalidation) conditions (see Section 4.2). For each such FLUSH condition, the FLUSH module provides a FLUSH output. M/IO#, W/R#, and the Address Bits A2/A8 are latched and used as QMIO/QWR/QADD inputs for the combinatorial logic in the PAL122. Latching in the PAL122 is not required for the other inputs—DC#, ADS#, LOCK#, the other Address Bits and the byte enable signals.

Figure 5B:
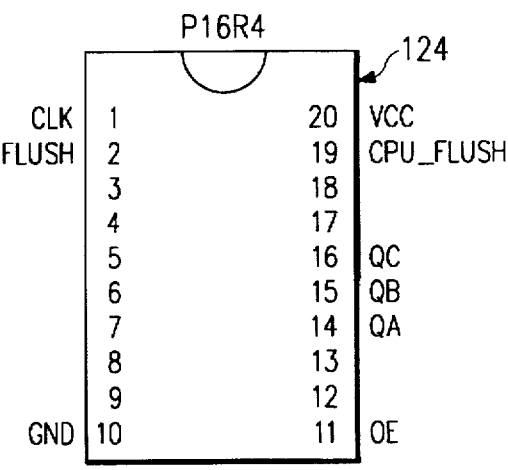

FIG. 5b illustrates the pinout for the WAVESHAPING module 124. The WAVESHAPING module receives the FLUSH output signal and generates a corresponding CPU/ FLUSH output with the appropriate set up and hold time for the microprocessor.

If the FLUSH module is designed to output a FLUSH signal with the required set up and hold time, the WAVESHAPING module could be eliminated.

The FLUSH output of the WAVESHAPING module is coupled to the microprocessor's FLUSH pin (see, Section 3.2). In response to an active CPU/FLUSH signal, the microprocessor invalidates the contents of the internal cache, such that a subsequent access to invalidated data entries will result in a cache miss.

4.1. Synchronization events. In general, the CPU and other bus masters in a multi-master computer system use one or more of the following bus master synchronization events to synchronize bus master access to the system (local) bus: (a) hardware generated interrupts, (b) accesses to I/O space, and/or (c) accesses to memory-mapped I/O space. In particular, in the PC bus architecture, bus master events are synchronized by interrupts and polled I/O, while in the microchannel bus architecture, bus master events can be synchronized by polled memory-mapped I/O, as well as by interrupts and polled I/O.

For the exemplary computer system using the PC bus architecture, the bus master synchronization events used for cache coherency are: (a) hardware generated interrupts, and (b) read or read/write accesses to I/O address space, except for access directed to selected peripherals—a hard disk or an external coprocessor. These flush mechanisms are readily implemented either on or off chip.

4.1.1. Hardware Generated Interrupts. For the exemplary embodiment, the FLUSH module 122 generates an active FLUSH signal every INTERRUPT ACKNOWLEDGE CYCLE2. This FLUSH-on-interrupt (FLINT) mechanism is used to maintain cache coherency when the exemplary microprocessor/cache coherency system is installed in a multi-master system where interrupts are used to synchronize events between bus masters.

With the 1K internal cache, a FLINT on all interrupts does not cause a significant degradation in performance—however, significantly increasing cache size (and correspondingly increasing cache-fill time) may require FLINT programmability so that only selected interrupts result in FLUSH conditions. FLINT programmability would have to take into account the fact that interrupt vectors can be dynamically changed by the programmer.

4.1.2. I/O Reads. For the exemplary embodiment, the FLUSH module 122 generates an active FLUSH signal for each read access or read/write to I/O space, except those directed to an external coprocessor or hard disk. This FLUSH-on-I/O (FLIO) flush mechanism is used to maintain cache coherency when the exemplary microprocessor/cache coherency system is installed in a multi-master system where polled I/O is used to synchronize events between bus masters.

Making FLIO programmable enables the cache coherency system to avoid asserting FLUSH for accesses to selected regions of I/O space that do not involve cache coherency considerations. Thus, for the exemplary embodiment, since industry standard IDE drives, ST506 disk drives, and math coprocessors all rely on program controlled data transfers, FLUSH need not be asserted in response to access to these devices.

As an alternative to implementing FLIO) only for read and read/write accesses, the FLUSH module could be configured to implement this flush mechanism for write accesses as well. For example, some specialized DMA boards communicate with the operating system through I/O space (such as for the purpose of communicating status information), so that write accesses to I/O space would be a cache/memory synchronization point for a computer system incorporating such a specialized board.

4.1.3. Memory-Mapped I/O Reads. To provide support for the microchannel bus architecture, the exemplary cache coherency system could be modified to include as bus master synchronization events used for cache coherency: read accesses to memory-mapped I/O address space. This FLUSH-on-memory-mapped I/O (FLMIO) flush mechanism would be used to maintain cache coherency for installations of the microprocessor/cache coherency system in a multi-master system where polled memory-mapped I/O is used to synchronize events between bus masters.

As with FLIO, making FLMIO programmable would enable the cache coherency system to avoid asserting FLUSH for accesses to selected regions of memory-mapped I/O space that would not involve cache coherency considerations. Thus, it would probably be advisable from a performance standpoint to exclude read accesses directed to a hard disk or an external coprocessor.

Unlike FLIO, implementing the FLMIO flush mechanism off chip in a companion FLMIO chip is probably not practical in terms of size and cost because such an implementation would require all of the Address and Data lines, and a number of the bus definition/control lines. For the exemplary microprocessor, including the cache control system, the recommended approach would be to implement-ing the FLMIO flush mechanism on-chip using registers similar to the non-cacheable region registers NCR1–NCR4 (see, Section 2.2).

For example, FLMIO could be implemented by designating the non-cacheable region register NCR4 to be programmable to define a region of memory-mapped I/O space as either (a) non-cacheable, or (b) non-cacheable with FLUSH. That is, a read or read/write access directed to a FLMIO location within the region specified by NCR4 would not be cached by the microprocessor, and would also cause the microprocessor to invalidate the contents of the cache.

As with FLIO, implementing FLMIO for write accesses may be advantageous for certain specialized hardware or software application. For example, specialized DMA boards.

4.2. FLUSH Module. Referring to FIG. 5a, the FLUSH module was implemented as a reprogrammable PAL, programmed to assert the FLUSH output on all bus master synchronization events—hardware generated interrupts and I/O reads except those to the coprocessor or disk. The FLUSH PAL is comprised of combinatorial logic—the FLUSH output signal is a pulse output that has not been shaped to provide the required set up and hold times for the FLUSH input to the microprocessor (that waveshaping function is performed by the WAVESHAPING module).

The FLUSH module identifies the bus cycle type from (a) the bus cycle definition signals M/IO#, D/C#, W/R#, and LOCK#, (b) the bus control signal ADS#, and (c) the address signals A31/A8/A2 and byte enable signals BE3#-BE0#. In particular, A31 is associated with the math coprocessor and A8 is associated with the hard disk, while A2 and the byte enable signals can be used to further define bus cycles associated with interrupts.

The inputs M/IO#, W/R#, and the Address Bits A2/A8 must be latched as QMIO/QWR/QADD and fed back as inputs for the combinatorial logic in the PAL. The inputs LOCK#, ADS#, Address Bit A31, and the byte enable signals BE3#-BE0# do not have to be latched.

The FLUSH module is clocked by the ADS# strobe that initiates each microprocessor bus cycle—the ADS line is tied to both the CLK and ADS input pins of the module. For each ADS# strobe, the FLUSH module decodes the input signals and generates an active low FLUSH output signal if either a FLINT or FLIO condition is detected.

The input pin definitions for the FLUSH module are:

| | |
|---|---|
| CLK,!OE | pin 1,11; |
| WR,DC,MIO,ADS,LOCK | pin 2,3,4,5,18; |
| BE0,BE1,BE2,BE3 | pin 6,7,8,9; |
| A2,A31,A8 | pin 12,13,17; | and the output pin definitions are:

| | |
|---|---|
| FLUSH | pin 19 |
| QA,QB,QC | pin 14,15,16 | where, ! designates NOT, and the following equates apply: H,L,X,Z,C=1,0,.X,..Z,..C..

The PAL equations for the FLUSH module can be written:

QA:=MIO
QB:=WR
QC:=A31 # A8
!FLUSH=((!QA & !DC & !QB & !LOCK & !BE0# & BE1 & BE2 & BE3# & !A2) # (!QA & !QB & !QC) )

where, :=designates a latched operation;=designates a combinatorial operation; & designates AND, and # designates OR. These PAL equations reduce to:

QA:=MIO
QB:=WR
QC:=A31 # A8
FLUSH=!(!QA & !QB & !QC # !A2 & !BE0# & BE1 & BE2 & BE3# & !DC & !LOCK & !QA & !QB)

These PAL equations define the configuration of the PAL to implement the FLINT and FLIO flush mechanisms in accordance with the exemplary embodiment. Implementing FLIO for write accesses would involve a straightforward modification of these PAL equations (the PAL could be configured to make FLIO for write accesses jumperable).

Test vectors for the exemplary FLUSH module are set forth in the Appendix at the end of the Specification.

4.3. WAVESHAPING Module. Referring to FIG. 5b, the WAVESHAPING module was implemented as a PAL, programmed to control the duty cycle of the CPU/FLUSH output signal provided to the FLUSH pin of the microprocessor. The WAVESHAPING PAL is comprised of both combinatorial and state machine logic.

The WAVESHAPING module receives the FLUSH signal from the FLUSH module, and generates a CPU/FLUSH output signal with the appropriate setup and hold time in relation to the Phase2 rising edge of the CLK (respectively 5ns and 3ns for the exemplary microprocessor). The CLK input for the WAVESHAPING is provided by the external clock PAL circuit. The registered (flip-flop) outputs QA/QB/QC represent states of the state machine (no connects).

The input pin definitions are:

| | |
|---|---|
| CLK,OE | pin 1,11 |
| FLUSH | pin 2 | and the output pin definitions are:

| | |
|---|---|
| QA,QB,QC | pins 14, 15, 16 |
| CPU/FLUSH | pin 19 | where the following equates apply:
H,L,X,Z,C=1,0,.X...Z...C.
ST=[QC, QB, QA]
S0=^b000
S1=^b001
S2=^b010
S3=^b011
S4=^b100
S5=^b101
S6=^b110
S7=^b111

The state diagrams for the waveshaping state machine are:
State S0: if FLUSH then S0 else S1
State S1: goto S2
State S2: goto S3
State S3: goto S4
State S4: goto S5
State S5: goto S6
State S6: if FLUSH then S0 else S7
State S7: goto S6

The PAL equation for the combinatorial logic can be written:

!CPU_FLUSH=(ST>=S1) & (ST<=S5);

This PAL equation reduces to:
QC:=!(!QA & !QC # !QB & !QC # FLUSH & !QA & QB);
QB:=!(QA & QB & !QC # !QA & !QB # FLUSH & !QA & QC)
QA:=!(QA # FLUSH & !QB & !QC # FLUSH & QB & QC); CPU_FLUSH=!(QA & !QC # !QB & QC # QB & !QC);

These state diagrams and PAL equations define the configuration of the WAVESHAPING PAL to control the duty cycle of the FLINT and FLIO flush mechanisms in accordance with the exemplary embodiment.

As described in Section 3.2, the exemplary microprocessor samples its FLUSH# pin every clock cycle (Phase 2). If the WAVESHAPING module has asserted CPU/FLUSH, the microprocessor will invalidate the cache—the length of time required to complete cache invalidation depends on the internal state of the execution pipeline. Until cache invalidation is complete, the microprocessor will not issue an ADS# strobe to begin a new bus cycle, so that any FLINT or FLIO condition occurring during cache invalidation will not result in CPU/FLUSH being asserted (i.e., the FLUSH module must await the next ADS# strobe).

Test vectors for the exemplary FLUSH module are set forth in the Appendix at the end of the Specification.

4.4. Alternative On-Chip Implementation. The cache coherency system can be readily implemented on chip. For the exemplary microprocessor, an appropriate system configuration to implement the FLINT, FLIO, and FLMIO flush mechanisms would be as follows.

The cache would be enabled at power up or reset, and configured as follows:

*NC0 Enabled - 1 Mbyte+64 Kbytes Non-cacheable
*NC1 Enabled - 640 Kbyte–1 Mbyte Non-cacheable
*Non-cacheable region register configuration
*Physical address C000 0000h (3 Gbyte)+64 Kbytes non-cacheable (this is the Weitek coprocessor address space)
*Physical address FFFF 0000h (4 Gbyte–64 Kbytes)+64 Kbytes Non-cacheable (this is the ROM BIOS physical address space).
*FLUSH Enabled - Set to take advantage of FLINT, FLIO, and FLMIO. (when FLUSH is disabled, FLINT, FLIO, and FLMIO) are ignored, and a cache flush will not occur).

With this cache configuration, the recommended approach to implementing FLINT and FLIO is given below—the recommended approach to implementing FLMIO is given in Section 4.1.3.

For FLINT, the microprocessor would be configured to execute a cache invalidation every Interrupt Acknowledge Cycle 2 when FLUSH is enabled. In addition, FLINT could be made programmable by including in the microprocessor design special FLINT registers to allow the programmability of the interrupt vectors that would generate FLUSH.

For FLIO, the recommended approach is to include in the microprocessor register set four FLIO address range registers, each programmed in a similar fashion to the non-cacheable region registers. The four I/O regions could be programmed to cause the microprocessor to execute a cache invalidation operation on I/O accesses to such devices as, Floppy Disks, Hard Disks, Network cards, and other bus master cards if required. For example, a recommended approach is to incorporate into the microprocessor four 16-bit FLIO registers, where bits 15–represent A15—A3, bit 2 controls flush on I/O read or I/O read/write, and bits 1 - 0 control I/O address region granularity.

| 15 | 3 2 | 1 0 | |
|---|---|---|---|
| Address A15 - A3 | R/W | Granularity | |
| Bit 2 | I/O Read Write | | |
| 0h | Flush on I/O Read only | | |
| 1h | Flush on I/O Read or Write | | |
| Bit 1 - 0 | Granularity | | |
| 0h | Disabled (No Flush) | | |
| 1h | 8 bytes | | |
| 2h | 16 bytes | | |
| 3h | Flush on all I/O | | |

5. Conclusion. Although the Detailed Description of the invention has been directed to certain exemplary embodiments, various modifications of these embodiments, as well as alternative embodiments, will be suggested to those skilled in the art. For example, the invention has general applicability to a method of data communication between asynchronous processes of a computer system so as to assure the validity of data in process-local buffers without reliance on cycle-by-cycle monitoring of communications between such asynchronous processes (where a process-local buffer is memory that is accessed only by a particular process, and is not necessarily a cache). This technique has specific application in implementing a cache coherency system for a processor-cache combination in which the processor-cache is used in a multi-master computer system in which multiple asynchronous processes access shared memory and associate with each such access a synchronization event that indicates when valid data is available (typically, for reads from a process, the synchronization event precedes data transfer, while for writes to a process, the synchronization event follows data transfer). Also, while the exemplary embodiment of the cache coherency system was described in the context of a microprocessor with internal primary cache, the invention is equally applicable to a microprocessor with external primary cache where the microprocessor does not receive bus arbitration signals sufficient to determine the precise nature of every bus cycle in the system. Although the exemplary embodiment was described in connection with a computer system that does not provide bus arbitration signals to the microprocessor socket, the invention has equal applicability to computer systems in which bus arbitration signals are available to the microprocessor, but cannot be used reliably for cache coherency purposes. The term "cache" is meant to be generic for any intermediate level memory between the execution unit and main memory, while the term "bus arbitration signal" is meant to be generic for any signal used to signal bus master communication events.

The invention encompasses any modifications or alternative embodiments that fall within the scope of the claims.

---

APPENDIX - TEST VECTORS

FLUSH Module: The test vectors for the FLUSH module are ([ CLK, WR, DC, MIO, LOCK, BE0, BE1, BE2, BE3, A2] ->FLUSH):

```
[ C, L, L, L, L, L, H, H, H, L ] -> L;
[ C, H, L, L, L, L, H, H, H, L ] -> H;
[ C, H, L, H, L, L, H, H, H, L ] -> H;
[ C, L, L, H, L, L, H, H, H, L ] -> H;
[ C, L, H, L, L, L, H, H, H, L ] -> L;
[ C, L, L, L, H, L, H, H, H, L ] -> L;
[ C, L, L, L, L, H, H, H, H, L ] -> L;
[ C, L, L, L, L, H, L, H, H, L ] -> L;
[ C, L, L, L, L, H, H, L, H, L ] -> L;
[ C, L, L, L, L, H, H, H, L, L ] -> L;
[ C, L, L, L, L, H, H, H, H, H ] -> L;
```

The test vectors to verify that a coprocessor cycle does not cause the FLUSH module to generate a FLUSH are ([ CLK, WR, DC, MIO, LOCK, BE0, BE1, BE2, BE3, A2, A31, A8 ] -> FLUSH)

```
[C, L, X, L, X, X, X, X, X, X, L, L ] -> L;
[C, L, X, L, X, X, X, X, X, X, L, H ] -> H;
[C, L, X, L, X, X, X, X, X, X, H, L ] -> H;
[C, L, X, H, X, X, X, X, X, X, H, H ] -> H;
[C, H, X, L, X, X, X, X, X, X, H, H ] -> H;
[C, H, X, H, X, X, X, X, X, X, H, H ] -> H;
```

WAVESHAPING Module: The test vectos for the WAVESHAPING module are ([Clk, FLUSH ] -> [ ST ]):

```
[.C., 1 ] -> [ X ];
[.C., 1 ] -> [ S0 ];
[.C., 1 ] -> [ S0 ];
[.C., 1 ] -> [ S0 ];
[.C., 1 ] -> [ S0 ];
[.C., 0 ] -> [ S1 ];
[.C., 1 ] -> [ S2 ];
[.C., 1 ] -> [ S3 ];
[.C., 1 ] -> [ S4 ];
[.C., 1 ] -> [ S5 ];
[.C., 1 ] -> [ S6 ];
```

---

APPENDIX - TEST VECTORS
-continued

```
[.C., 1 ] -> [ S0 ];
[.C., 1 ] -> [ S0 ];
[.C., 1 ] -> [ S0 ];
[.C., 1 ] -> [ S0 ];
[.C., 1 ] -> [ S0 ];
[.C., 0 ] -> [ S1 ];
[.C., 0 ] -> [ S2 ];
[.C., 0 ] -> [ S3 ];
[.C., 0 ] -> [ S4 ];
[.C., 0 ] -> [ S5 ];
[.C., 0 ] -> [ S6 ];
[.C., 0 ] -> [ S7 ];
[.C., 0 ] -> [ S6 ];
[.C., 0 ] -> [ S7 ];
[.C., 0 ] -> [ S6 ];
[.C., 0 ] -> [ S7 ];
[.C., 1 ] -> [ S6 ];
[.C., 1 ] -> [ S0 ];
[.C., 1 ] -> [ S0 ];
```

The test vectors for the FLUSH pin and the WAVESHAPING module are ([Clk, FLUSH ] -> [ ST, CPU_FLUSH ]):

```
[.C., 1 ] -> [X, X ];
[.C., 1 ] -> [S0, 1 ];
[.C., 1 ] -> [S0, 1 ];
[.C., 1 ] -> [S0, 1 ];
[.C., 1 ] -> [S0, 1 ];
[.C., 0 ] -> [S1, 0 ];
[.C., 1 ] -> [S2, 0 ];
[.C., 1 ] -> [S3, 0 ];
[.C., 1 ] -> [S4, 0 ];
[.C., 1 ] -> [S5, 0 ];
[.C., 1 ] -> [S6, 1 ];
[.C., 1 ] -> [S0, 1 ];
[.C., 1 ] -> [S0, 1 ];
[.C., 1 ] -> [S0, 1 ];
[.C., 1 ] -> [S0, 1 ];
[.C., 1 ] -> [S0, 1 ];
[.C., 0 ] -> [S1, 0 ];
[.C., 0 ] -> [S2, 0 ];
[.C., 0 ] -> [S3, 0 ];
[.C., 0 ] -> [S4, 0 ];
[.C., 0 ] -> [S5, 0 ];
[.C., 0 ] -> [S6, 1 ];
[.C., 0 ] -> [S7, 1 ];
[.C., 0 ] -> [S6, 1 ];
[.C., 0 ] -> [S7, 1 ];
[.C., 0 ] -> [S6, 1 ];
[.C., 0 ] -> [S7, 1 ];
[.C., 1 ] -> [S6, 1 ];
[.C., 1 ] -> [S0, 1 ];
[.C., 1 ] -> [S0, 1 ];
```

What is claimed is:

1. A data processor suitable for operation in a shared memory computer system, comprising an execution unit operably coupled with a buffer including addressable data storage locations accessible by said execution unit, and a detector coupled to said processor to detect signals generated by said processor representing at least one of (A) accesses to I/O space, and (B) accesses to memory mapped I/O space, and to output a data invalidation signal to at least some of said data storage locations of said buffer in response to said detection.

2. The data processor of claim 1, wherein said buffer is a local cache.

3. The data processor of claim 1, wherein said buffer is processor-local write through cache.

4. The data processor of claim 1, wherein said detector is coupled to said processor, externally of said processor, to receive either or both of said signals generated by said processor.

5. The data processor of claim 1, wherein said accesses to I/O space include read accesses.

6. The data processor of claim 1, wherein said accesses to I/O space include read/write accesses.

7. The data processor of claim 1, wherein said accesses to I/O space include accesses to all locations except non-DMA disk and external coprocessor space locations.

8. A data processor suitable for operation in a shared memory computer system in which a plurality of bus masters, including said processor, can access shared memory over a common bus, comprising an execution unit operably coupled with a buffer including addressable data storage locations accessible by said execution unit, and a detector coupled to said processor to detect selected bus cycle definition signals generated by said processor representing at least one of (A) accesses to I/O space, (B) accesses to memory mapped I/O space, and (C) selected hardware generated interrupts, and to output a data invalidation signal to at least some of said data storage locations of said buffer in response to said detection.

9. The data processor of claim 8, wherein said accesses to I/O space and to memory mapped I/O space comprise accesses to all I/O space locations and all memory mapped I/O space locations except non-DMA disk and external coprocessor space locations.

10. The data processor of claim 8, wherein said signals representing accesses include read accesses.

11. The data processor of claim 8, wherein said signals representing accesses include read/write accesses.

12. The data processor of claim 8, wherein said invalidation signal is applied to all of said data storage locations of said buffer.

13. The data processor of claim 8, wherein said detector includes inputs coupled to signal terminals of said processor.

14. The data processor of claim 8, wherein said detector includes inputs coupled externally of said processor to signal terminals of said processor.

15. A data processor suitable for use in a computer system in which a plurality of bus masters, including said processor, can access shared memory over a bus, said processor comprising an internal cache, said cache having data storage locations accessible by said processor, and synchronization event detection means for detecting at said processor the occurrence of bus master synchronization events indicative of possible accesses to said shared memory by bus masters other than said processor, said detection means responsive to detection of a said bus-master synchronization event for outputting a data invalidation signal to at least some of said data storage locations of said cache.

16. The data processor of claim 15, wherein said detection means comprises logic circuitry having inputs coupled to said processor to receive signals generated by said processor indicative of said bus master synchronization events.

17. The data processor of claim 16, wherein said logic circuitry inputs are coupled to signal terminals of said processor, said logic circuitry including an output coupled to a cache invalidation signal input of said processor.

18. The data processor of claim 17, wherein said detector comprises a programmable logic array.

19. A single chip microprocessor suitable for operation in a shared memory computer system in which a plurality of bus masters, including said microprocessor can access shared memory over a common bus; comprising an execution unit operably coupled with a buffer including addressable storage locations accessible by said execution unit, and a detector coupled to said microprocessor to detect signals generated by said microprocessor indicative of bus-master synchronization events, and in response to said detection to output a data invalidation signal to at least some of said storage locations of said buffer.

20. The single chip microprocessor of claim 19, wherein said bus-master synchronization events are indicated by selected bus cycle definition signals representing accesses to I/O space or to memory mapped I/O space.

21. The single chip microprocessor of claim 20, wherein said bus cycle definition signals comprise Memory/IO, Data/Control, and Write/Read signals.

22. The single chip microprocessor of claim 19, wherein said bus-master synchronization events are indicated by selected hardware generated interrupts.

23. A cache coherency system for a processor operably coupled to a cache in which data entries can be stored for access by said processor and operable in a multi-master, shared memory computer system in which bus arbitration signals are not used by said processor to assure validity of data in the cache, comprising:

synchronization event detection logic coupled to said processor to detect the occurrence at said processor of hardware generated interrupts; and cache invalidation logic coupled between said synchronization event detection logic and said cache to respond to detection by said synchronization event detection logic of each of said hardware generated interrupts by applying an invalidation signal to at least some of the data entry locations in said cache;

whereby valid data will be supplied to said processor in response to subsequent accesses to the cache.

24. The cache coherency system of claim 23, wherein the cache is a write-through cache.

25. The cache coherency system of claim 24, wherein said cache invalidation logic is coupled to said cache to apply said invalidating signal to all data entry locations in said cache in response to detection by said synchronization event detection logic of said hardware generated interrupts.

26. The cache coherency system of claim 23, wherein said synchronization event detection logic detects only programmably selected hardware generated interrupts.

27. The cache coherency system of claim 23, wherein said synchronization event detection logic is coupled to said processor also to detect signals generated by said processor to access selected regions of I/O space; and said cache invalidation logic also responds to detection by said synchronization event detection logic of said signals generated by said processor to access selected regions of I/O space by applying said invalidation signal to at least some of the data entry locations in said cache.

28. The cache coherency system of claim 27, wherein said selected regions of I/O space are all I/O space regions except I/O space regions allocated to non-DMA disks and external coprocessors.

29. The cache coherency system of claim 27, wherein said selected regions of I/O space are defined by selected addresses, bus cycle definition signals and bus control signals, generated by said processor.

30. The cache coherency system of claim 29, wherein said signals generated by said processor to access selected regions of I/O space are read or read/write signals.

31. The cache coherency system of claim 23, wherein the synchronization event detection logic is coupled to said processor also to detect selected signals generated by said processor to access selected regions of memory-mapped I/O space; and said cache invalidation logic also responds to detection by said synchronization event detection logic of said signals generated by said processor to access selected regions of memory-mapped I/O space by applying said invalidation signal to at least some of the data entry locations in said cache.

32. The cache coherency system of claim 23, wherein said synchronization event detection logic further comprises waveshaping logic to control set up and hold times for said cache invalidation signals.

33. The cache coherency system of claim 23, wherein said synchronization event detection logic is implemented external to said processor.

34. A method of implementing cache coherency in a multi-master computer system in which a plurality of asynchronous processes access shared memory and associate with each such access a synchronization event that indicates when valid data is available from said shared memory, and wherein at least a selected one of said processes accesses data entries stored in a cache, comprising the steps:

monitoring said selected process to detect occurrence of hardware generated interrupts; and in response to each said detection, invalidating at least part of the data entries stored in said local cache;

thereby enabling valid data to be supplied to said selected process in response to subsequent accesses to said cache.

35. The cache coherency method of claim 34, wherein said monitoring step detects programmably selected hardware generated interrupts.

36. The method of claim 34, wherein said monitoring step further detects activation of selected signals by said selected process to access selected regions of I/O space, and in response to each said further detection, invalidates at least part of the data entries stored in said local cache.

37. The cache coherency method of claim 36, wherein the selected regions of I/O space are all I/O space locations except non-DMA disk and external coprocessor I/O space locations.

38. The method of claim 34, wherein said monitoring step further detects activation of selected signals by said selected process to access memory-mapped I/O space; and in response to each said further detection, invalidates at least part of the data entries stored in said local cache.

39. A method of data communication between asynchronous processes in a computer system in which at least one selected process has a process-local buffer storing data entries that can be accessed by said selected process; comprising the steps:

monitoring said selected process to detect communication between said selected process and another of said asynchronous processes including occurrence of hardware generated interrupts at said selected process; and in response to each said detected occurrence of a said hardware generated interrupt, invalidating at least a portion of the data entries in such process-local buffer.

40. The data communication method of claim 39, wherein the process-local buffer is implemented in a cacheable region of memory address space.

* * * * *